US011525955B1

(12) United States Patent
Lin et al.

(10) Patent No.: US 11,525,955 B1
(45) Date of Patent: Dec. 13, 2022

(54) ELECTRONIC DEVICES WITH DRAWN SHEET-PACKED COHERENT FIBER BUNDLES

(71) Applicant: Apple Inc., Cupertino, CA (US)

(72) Inventors: Wei Lin, Santa Clara, CA (US); Nathan K. Gupta, San Francisco, CA (US); Prabhakar Gulgunje, Cupertino, CA (US); Shubhaditya Majumdar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/327,441

(22) Filed: May 21, 2021

Related U.S. Application Data

(60) Provisional application No. 63/035,584, filed on Jun. 5, 2020.

(51) Int. Cl.
*G02B 6/06* (2006.01)
*G02B 6/08* (2006.01)

(52) U.S. Cl.
CPC .............. *G02B 6/065* (2013.01); *G02B 6/08* (2013.01)

(58) Field of Classification Search
None
See application file for complete search history.

(56) References Cited

U.S. PATENT DOCUMENTS

| | | | |
|---|---|---|---|
| 4,349,817 A | 9/1982 | Hoffman et al. | |
| 4,534,813 A | 8/1985 | Williamson et al. | |
| 5,329,386 A | 7/1994 | Birecki et al. | |
| 5,502,457 A | 3/1996 | Sakai et al. | |
| 5,659,378 A | 8/1997 | Gessel | |
| 6,046,730 A | 4/2000 | Bowen et al. | |
| 6,407,785 B1 | 6/2002 | Yamazaki | |
| 6,465,095 B1 | 10/2002 | Dugan | |
| 6,467,922 B1 | 10/2002 | Blanc et al. | |
| 6,680,761 B1 | 1/2004 | Greene et al. | |
| 6,845,190 B1 | 1/2005 | Smithwick et al. | |
| 6,892,011 B2 * | 5/2005 | Walker | B29C 48/21 385/115 |
| 7,228,051 B2 | 6/2007 | Cok et al. | |
| 7,542,209 B2 | 6/2009 | McGuire, Jr. | |
| 7,823,309 B2 | 11/2010 | Albenda | |
| 7,856,161 B2 | 12/2010 | Tabor | |

(Continued)

FOREIGN PATENT DOCUMENTS

KR 20180034832 A 4/2018

*Primary Examiner* — Jerry Rahll
(74) *Attorney, Agent, or Firm* — Treyz Law Group, P.C.; G. Victor Treyz; Tianyi He

(57) ABSTRACT

An electronic device may have a display, a display cover layer, and a drawn sheet-packed coherent fiber bundle. The coherent fiber bundle may have an input surface that receives an image from the display and a corresponding output surface to which the image is transported. The coherent fiber bundle may be placed between the display and the display cover layer and mounted to a housing. The coherent fiber bundle may have fiber cores with bends that help conceal the housing from view and make the display appear borderless. The coherent fiber bundle has filaments formed from elongated strands of binder in which multiple fibers are embedded. Sheets of filaments are stacked and fused together to form a block of material that is subsequently drawn to form the drawn sheet-packed coherent fiber bundle.

22 Claims, 14 Drawing Sheets

(56) References Cited

U.S. PATENT DOCUMENTS

| | | |
|---|---|---|
| 8,045,270 B2 | 10/2011 | Shin et al. |
| 8,723,824 B2 | 5/2014 | Myers et al. |
| 8,824,779 B1 | 9/2014 | Smyth |
| 8,976,324 B2 | 3/2015 | Yang et al. |
| 9,268,068 B2 | 2/2016 | Lee |
| 9,312,517 B2 | 4/2016 | Drzaic et al. |
| 9,342,105 B2 | 5/2016 | Choi et al. |
| 9,509,939 B2 | 11/2016 | Henion et al. |
| 9,591,765 B2 | 3/2017 | Kim et al. |
| 9,755,004 B2 | 9/2017 | Shieh et al. |
| 9,818,725 B2 | 11/2017 | Bower et al. |
| 9,871,948 B2 | 1/2018 | Papadopoulos et al. |
| 9,907,193 B2 | 2/2018 | Lee et al. |
| 10,048,532 B2 | 8/2018 | Powell et al. |
| 10,052,831 B2 | 8/2018 | Welker et al. |
| 11,143,806 B1* | 10/2021 | Carbone ............ H01L 51/5275 |
| 11,215,752 B1* | 1/2022 | Lin ......................... G02B 6/08 |
| 11,247,421 B1* | 2/2022 | Gulgunje ................. G02B 6/08 |
| 2002/0168157 A1* | 11/2002 | Walker ............ B29D 11/00663 |
| | | 385/115 |
| 2006/0016448 A1 | 1/2006 | Ho |
| 2007/0097108 A1 | 5/2007 | Brewer |
| 2008/0144174 A1 | 6/2008 | Lucente et al. |
| 2008/0186252 A1 | 8/2008 | Li |
| 2010/0177261 A1 | 7/2010 | Jin et al. |
| 2010/0238090 A1 | 9/2010 | Pomerantz et al. |
| 2011/0025594 A1 | 2/2011 | Watanabe |
| 2011/0057861 A1 | 3/2011 | Cok et al. |
| 2011/0102300 A1 | 5/2011 | Wood et al. |
| 2011/0242686 A1 | 10/2011 | Watanabe |
| 2012/0218219 A1 | 8/2012 | Rappoport et al. |
| 2013/0081756 A1 | 4/2013 | Franklin et al. |
| 2013/0083080 A1 | 4/2013 | Rappoport et al. |
| 2013/0235560 A1 | 9/2013 | Etienne et al. |
| 2013/0236153 A1 | 9/2013 | Rochette et al. |
| 2013/0279088 A1 | 10/2013 | Raff et al. |
| 2014/0037257 A1 | 2/2014 | Yang et al. |
| 2014/0092028 A1 | 4/2014 | Prest et al. |
| 2014/0092346 A1 | 4/2014 | Yang et al. |
| 2014/0183473 A1 | 7/2014 | Lee et al. |
| 2014/0240985 A1 | 8/2014 | Kim et al. |
| 2014/0328041 A1 | 11/2014 | Rothkopf et al. |
| 2014/0354920 A1 | 12/2014 | Jang et al. |
| 2015/0093087 A1 | 4/2015 | Wu |
| 2015/0185428 A1 | 7/2015 | Tani et al. |
| 2015/0227227 A1 | 8/2015 | Myers et al. |
| 2016/0231784 A1 | 8/2016 | Yu et al. |
| 2016/0234362 A1 | 8/2016 | Moon et al. |
| 2017/0094814 A1* | 3/2017 | Chin ................... H01L 27/3293 |
| 2017/0235341 A1 | 8/2017 | Huitema et al. |
| 2018/0052312 A1 | 2/2018 | Jia et al. |
| 2018/0088416 A1 | 3/2018 | Jiang et al. |
| 2018/0128973 A1 | 5/2018 | Powell et al. |
| 2018/0372958 A1 | 12/2018 | Karafin et al. |

* cited by examiner

ELECTRONIC DEVICES WITH DRAWN SHEET-PACKED COHERENT FIBER BUNDLES

This application claims the benefit of U.S. provisional patent application No. 63/035,584, filed Jun. 5, 2020, which is hereby incorporated by reference herein in its entirety.

FIELD

This relates generally to electronic devices, and, more particularly, to coherent fiber bundles for electronic devices with displays.

BACKGROUND

Electronic devices may have displays. Displays have arrays of pixels for displaying images for a user. To protect sensitive display structures from damage, displays may be provided with display cover layers. Display cover layers may be formed from glass, crystalline materials such as sapphire, or polymer.

SUMMARY

An electronic device may have a display, a display cover layer, and a drawn sheet-packed coherent fiber bundle. The coherent fiber bundle may have an input surface that receives an image from the display and a corresponding output surface to which the image is transported. The coherent fiber bundle may be placed between the display and the display cover layer and mounted to a housing. The coherent fiber bundle may have fiber cores with bends that help conceal the housing from view and make the display appear borderless.

The coherent fiber bundle may have filaments formed from elongated strands of binder in which multiple fiber cores are embedded. Sheets of filaments can be stacked and fused together to form a sheet-stacked coherent fiber bundle. The sheet-stacked coherent fiber bundle is drawn to form the drawn sheet-packed coherent fiber bundle.

The process of drawing the sheet-packed coherent fiber bundle reduces the lateral dimensions of the coherent fiber bundle. The drawing process also helps reduce fiber misalignment and the lateral separation between fiber cores, thereby helping to enhance optical quality.

DETAILED DESCRIPTION

An electronic device may have a display. The display may have an array of pixels for creating an image. The image may be visible through transparent structures that overlap the array of pixels. These structures may include an image transport layer such as a coherent fiber bundle overlapped by a clear display cover layer.

The coherent fiber bundle may be included in the electronic device to help minimize display borders or to otherwise create a desired appearance for the display. The coherent fiber bundle may have an input surface that receives an image from an array of pixels and a corresponding output surface to which the image is transported from the input surface. A layer of glass, polymer, or other clear material may be used to form a display cover layer that protects the output surface. A user viewing the electronic device will view the image from the array of pixels as being located on the output surface. In some arrangements, image transport layers formed from coherent fiber bundles and/or protective cover layers can be formed over components other than displays.

In configurations in which the input and output surfaces of an image transport layer such as a coherent fiber bundle have different shapes, the image transport layer may be used to warp the image produced by the array of pixels. For example, the shape of the image can be transformed and the effective size of the image can be changed as the image passes through the image transport layer. In some configurations, edge portions of the image are stretched outwardly to help minimize display borders.

Glass, polymer, and/or other transparent materials may be used in forming image transport layer structures. Display cover layers for protecting underlying display structures such as pixel arrays and image transport layers may be formed from transparent materials such as glass, clear polymer, or crystalline material such as sapphire.

Figure 1:
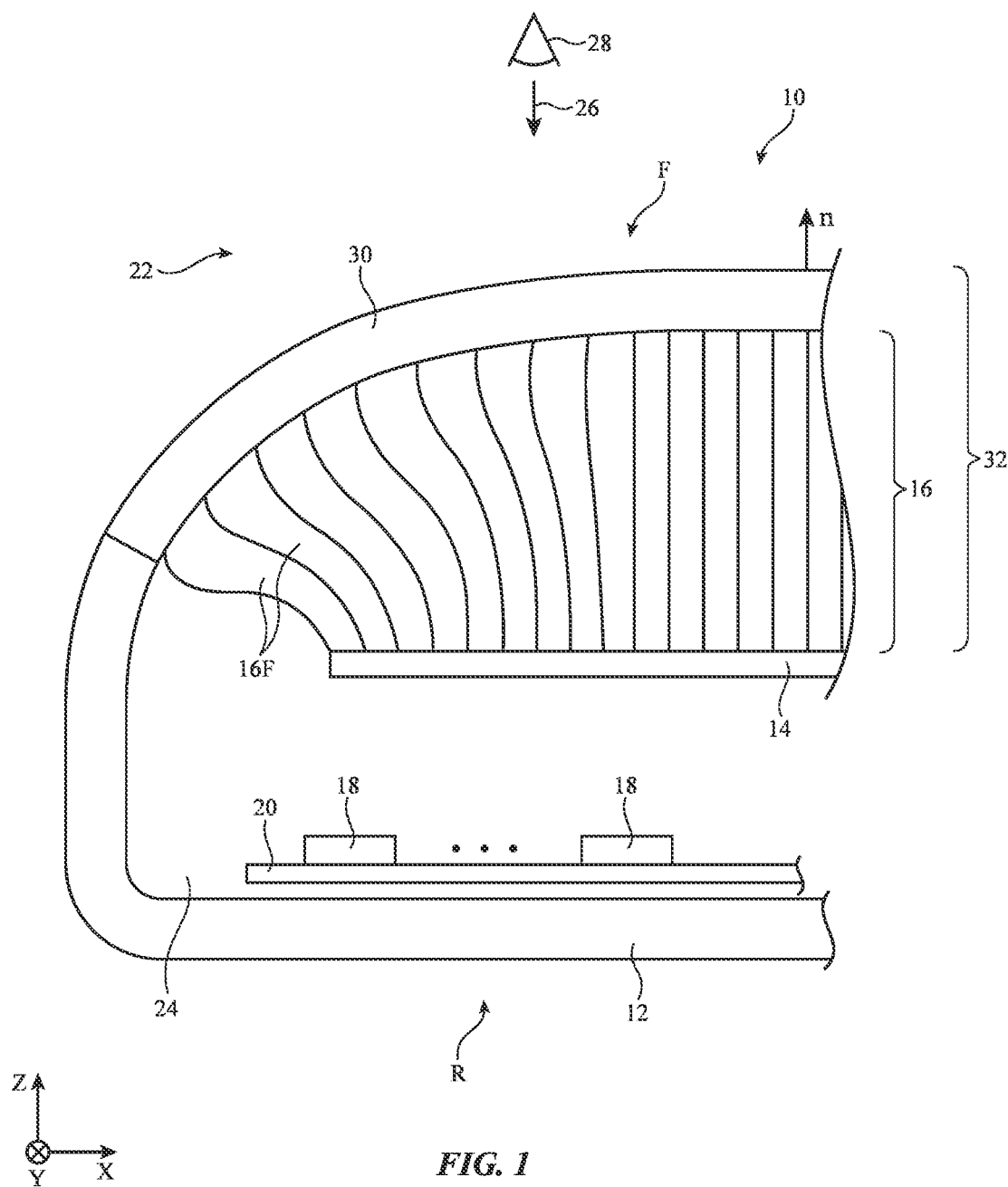
FIG. 1 is a side view of an illustrative electronic device with an image transport layer in accordance with an embodiment.

A cross-sectional side view of a portion of an illustrative electronic device having a display that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. For example, housing 12 may have a rear housing wall on rear face R and this rear housing wall may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with light-emitting diodes formed from respective crystalline light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer, protective cover layer structures, etc.).

In the example of FIG. 1, display (pixel array) 14 is mounted under protective layer(s) 32. Layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, layer 32 may include image transport layer 16 and display cover layer 30. Display cover layer 30 serves as a protective outer layer for device 10 and display 14. Display cover layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted and layer 16 may serve as a protective display cover layer (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between layer 30 and image transport layer 16 and/or may be included elsewhere in the stack of layers on display 14.

During operation, the pixels of display 14 produce image light that passes through image transport layer 16 (sometimes referred to as an image transfer layer). In configurations in which image transport layer 16 is formed from a coherent fiber bundle, image transport layer 16 has optical fibers 16F. The fibers or other optical structures of image transport layer structures such as image transport layer 16 transport (transfer) light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes (e.g., a circular outline when viewed in direction 26). To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (e.g., the bends in fibers 16F along their lengths) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 (e.g., the periphery of housing 12) from view. This helps make the display of device 10 appear borderless to viewer 28. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
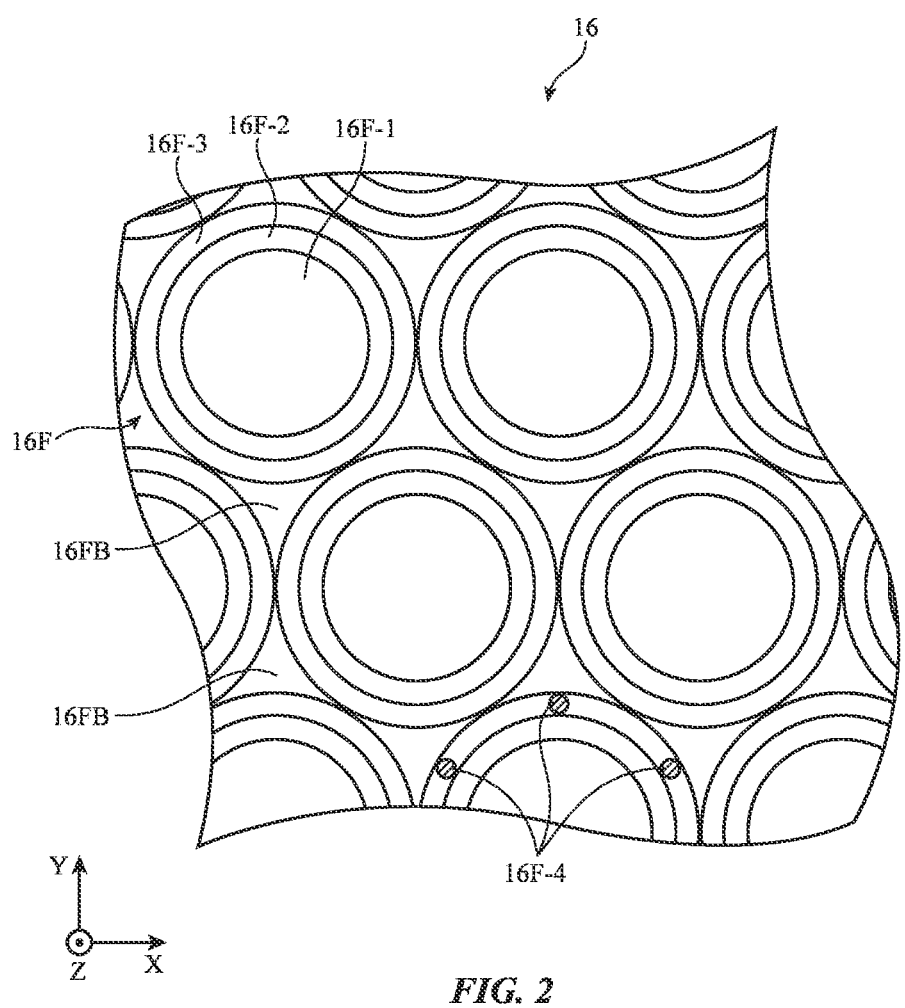
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer 16 (e.g., cladding structures, binder, etc.) may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers and join fibers 16F together. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are formed directly in binder 16FB without any intervening cladding, arrangements in which cores 16F-1 are covered with layers 16F-2 and embedded into binder 16FB without any additional coating layers such as coating layers 16F-3, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material, lower than the refractive index of the cladding material to promote total internal reflection, or higher than the refractive index of the cladding material (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower (or higher) than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Coating layers such as coating layer 16F-2 (e.g. a transparent cladding layer) may have thicknesses of at least 0.1 microns, at least 0.4 microns, less than 2.5 microns, less than 0.8 microns, etc. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

Figure 3:
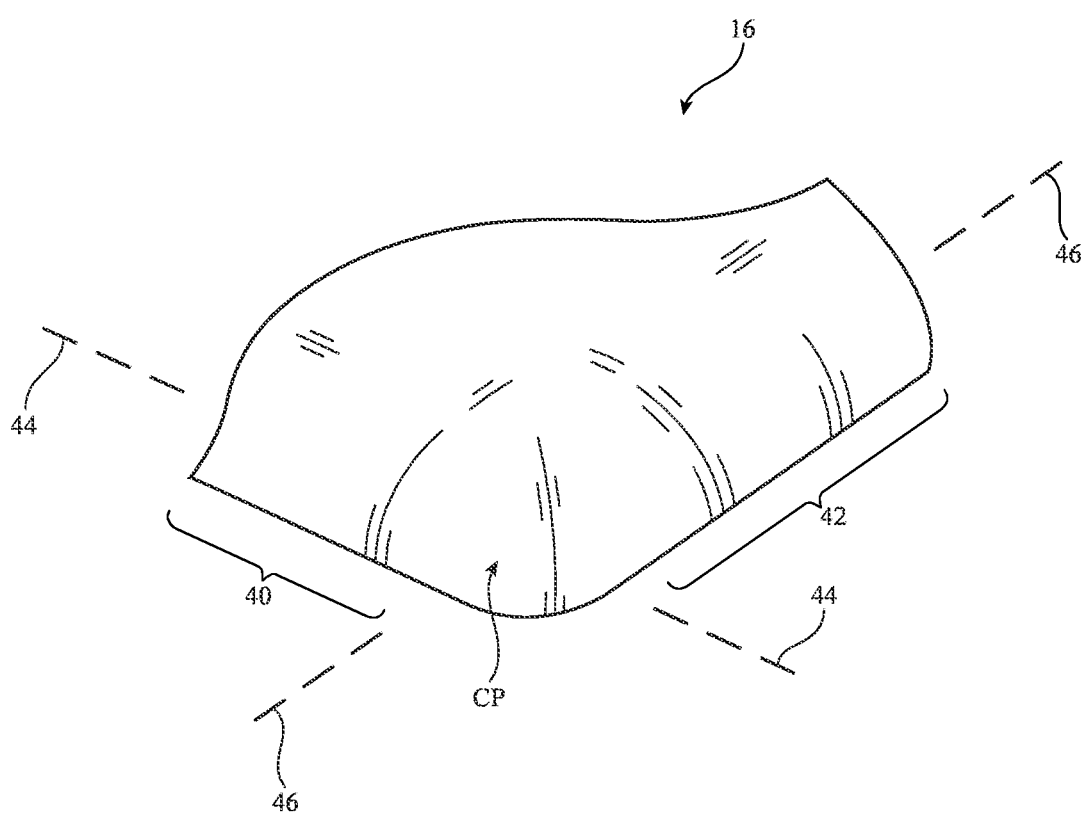
FIG. 3 is a perspective view of a portion of an image transport layer surface with compound curvature in accordance with an embodiment.

Image transport layers can be used to transport an image from a first (input) surface (e.g., the surface of a pixel array) to a second (output) surface (e.g., a surface in device 10 with compound curvature or other curved and/or planar surface shape) while preserving the integrity of the image. A perspective view of an illustrative corner portion of image transport layer 16 is shown in FIG. 3. In the example of FIG. 3, layer 16 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 3, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces, an edge surface of compound curvature that runs along the circular periphery of a central circular planar region, etc.). When overlapped by layer 30, the overlapping portions of layer 30 may have corresponding surfaces with compound curvature. When selecting the size and shape of the output surface of layer 16 and therefore the size and shape of the image presented on the output surface, the use of an image transport layer material with compound curvature can provide design flexibility. In general, layer 30 and layer 16 may have planar surfaces and/or surfaces with curved cross-sectional profiles.

Figure 4:
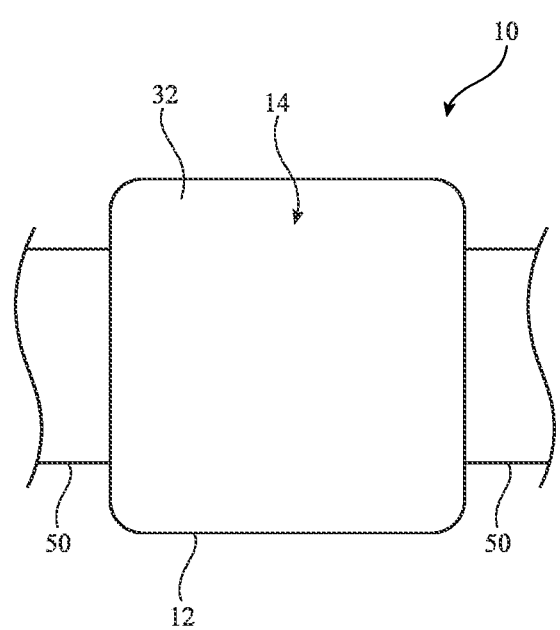
FIG. 4 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 4. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

Image transport layer 16 may have properties that help ensure satisfactory optical quality and thereby ensure that images are transported from the input surface of layer 16 to the output surface of layer 16 without undesired visual artifacts (e.g., without undesired haziness, non-uniformity, etc.).

Figure 5:
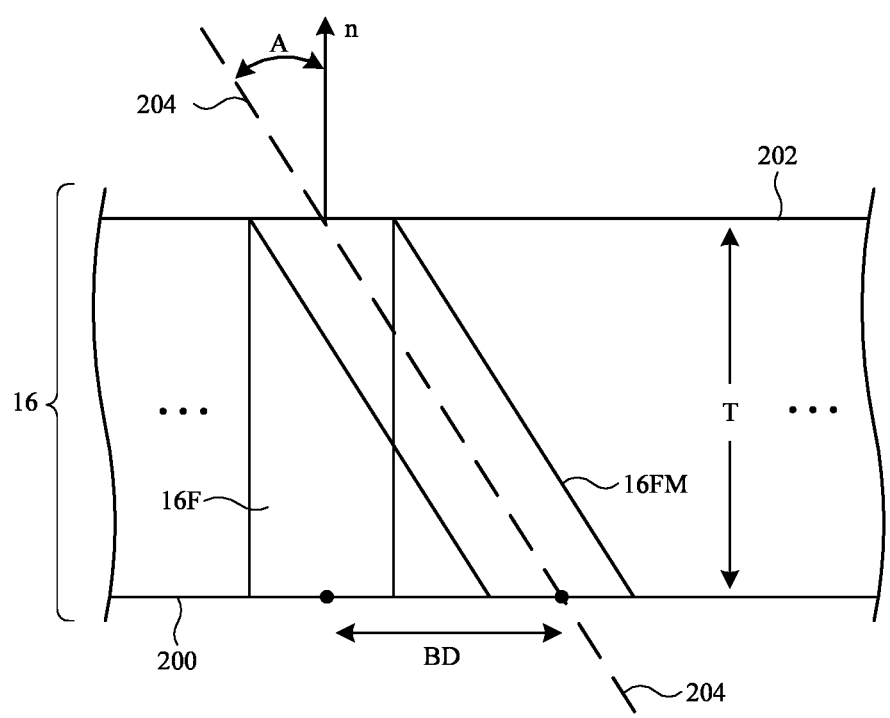
FIG. 5 is a cross-sectional side view of a portion of an illustrative coherent fiber bundle having a misaligned fiber in accordance with an embodiment.

One attribute that may help ensure satisfactory optical quality relates to fiber alignment. If fibers 16F are oriented improperly and therefore do not run parallel to each other, image quality may be adversely affected. To help ensure that undesired visual artifacts are not present, fibers 16F of image transport layer 16 should generally be aligned in parallel with each other within a tight tolerance. Consider, as an example, image transport layer 16 of FIG. 5. Image transport layer 16 has multiple fibers 16F extending along axis Z (e.g., an axis that is perpendicular to the surface normal n of FIG. 1, which coincides with the surface normal of display 14) between input surface 200 and output surface 202. Due to manufacturing variations, some of fibers 16F may not be perfectly aligned with axis Z. For example, one or more of fibers 16F may be tilted away from surface normal n. As shown in FIG. 5, for example, longitudinal axis 204 of fiber 16FM may be oriented at a non-zero angle A with respect to surface normal n. As a result of this misalignment (non-parallelism) of fiber 16FM, the core of fiber 16FM is laterally misaligned (laterally offset) by a distance BD at the input surface of layer 16.

To ensure a desired optical quality for image transport layer 16, distance BD may be less than one half of the lateral dimensions of the pixels in display 14. If, as an example, display 14 has an array of pixels that each have lateral dimensions (in the X-Y plane) of 50 microns, it may be desirable to ensure that fibers 16F have angles A that are sufficiently small to maintain distance BD at a value of less than 25 microns (or less than 30 microns, or other suitable amount).

The thickness T of image transport layer 16 can influence the angle A that is to be used. For example, if thickness T is made larger, it will generally be desirable to reduce angle A by a corresponding amount. In an illustrative configuration, fibers 16F exhibit an angular misalignment (maximum value of A for at least 90% or at least 95% of fibers 16F) of less than 0.8° when the thickness T of image transport layer 16 is about 1.35 mm, 1.3-1.4 mm, at least 1.2 mm, at least 1.3 mm, at least 1.4 mm, or other suitable value). Other maximum values of angular misalignment (AMAX) may be used in image transport layer 16, if desired. For example, AMAX (satisfied for at least 90% or at least 95% of fibers 16F) may have a value of 1.5°, 1.2°, 1.0°, 0.7°, 0.2-0.5°, etc. The maximum lateral deviation of fiber 16F at input surface 200 (BDMAX) may have any suitable value. For example, BDMAX (satisfied for at least 90% or at least 95% of fibers 16F) may be 75 microns, 60 microns, 40 microns, 20 microns, etc. The value of BDMAX may be equal to any suitable fraction of the maximum lateral dimension (pixel width PW) of the pixels in display 14. For example, BDMAX may be 50% of PW, 75% of PW, 30% of PW, 20% of PW, etc. Ensuring that fibers 16F are sufficiently parallel to maintain (for at least 90% or at least 95% of the fibers in layer 16) that BD is less than BDMAX and/or that A is less than AMAX (when layer 16 has a desired thickness T) will help ensure that the image quality for images transported through layer 16 is satisfactory.

Figure 6:
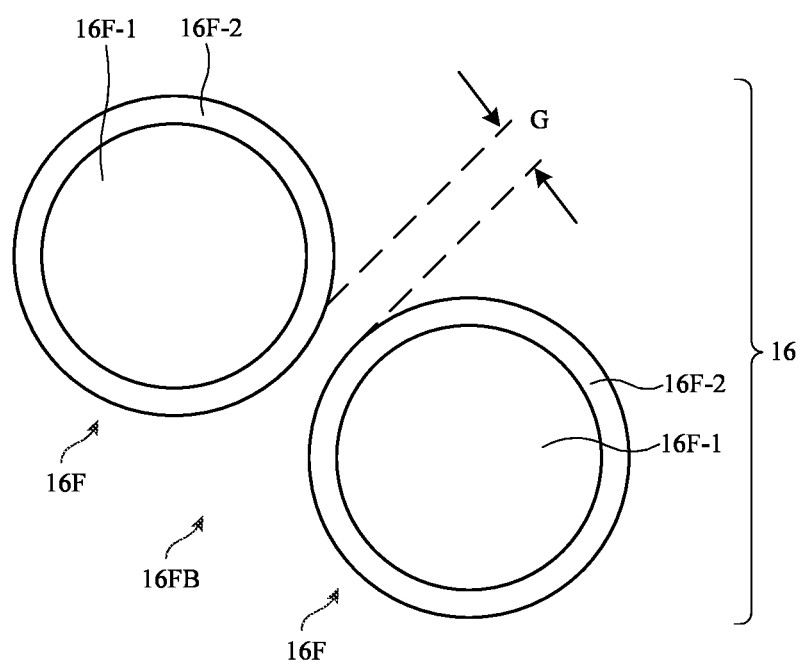
FIG. 6 is a cross-sectional view of a coherent fiber bundle having closely spaced fibers in accordance with an embodiment.

Another factor that can affect image transport layer quality relates to the fraction of the input and output surfaces that are occupied with binder 16FB versus fibers 16F (e.g., cores 16F-1). As shown in FIG. 6, there may be non-zero gaps G between adjacent fibers 16F in layer 16 due to manufacturing constraints. To help ensure that image transport layer 16 transports images satisfactorily, it may be desirable for at least some of the fibers 16F in layer 16 to be separated by a gap G from neighboring fibers 16F that has a value less than GMAX, where GMAX is equal to 1 micron, 0.8 microns, 0.7 microns, 0.6 microns, 0.5 microns, 0.4 microns, or other suitable value. For example, 100% of fibers 16F may be separated from their nearest neighbors by a gap G of less than 1 micron, 90% of fibers 16F may be separated from their nearest neighbors by a gap G of less than 0.7 microns, and 50% of fibers 16F may be separated by a gap G of less than 0.5 microns.

If desired, image transport layer material may be formed from filaments of material each of which include multiple fiber cores. Filaments may, as an example, be formed using an extrusion process. Subsequent fusing operations (e.g., sheet fusing operations) can create sheets of filaments that are stacked to form blocks of filaments. The blocks of sheet-stacked filaments can be drawn in a draw tower or other drawing equipment, to reduce their lateral dimensions. The drawing process also helps align fibers 16F and thereby satisfy desired angular alignment criteria, help reduce the size of gap G and thereby ensure that G is as small as desired, and/or satisfy other criteria that help ensure that a desired optical quality for layer 16 is achieved.

During drawing operations, the diameters of fiber cores 16F-1 are reduced. The amount that the fiber sizes are reduced in this way can be characterized by a draw ratio DR, defined in equation 1.

$$DR = D1^2/D2^2 \tag{1}$$

In equation 1, D1 is the initial fiber diameter (e.g., the diameter of fiber 16F or fiber core 16F-1) before drawing and D2 is the final fiber diameter (e.g., the diameter of fiber 16F or core 16F-1) after drawing operations are complete (e.g., the diameter of fibers 16F or cores 16F-1 in image transport layer 16 of FIG. 1). To ensure satisfactory results, it may be desirable to ensure that draw ratio DR is more than a minimum amount DRMIN. The value of DRMIN may be 1.7, 2.0, 2.5, 3.0, 3.5, 4.0, 5, 7, 9, 10, 12, 14, or 20 (as examples).

Figure 7:
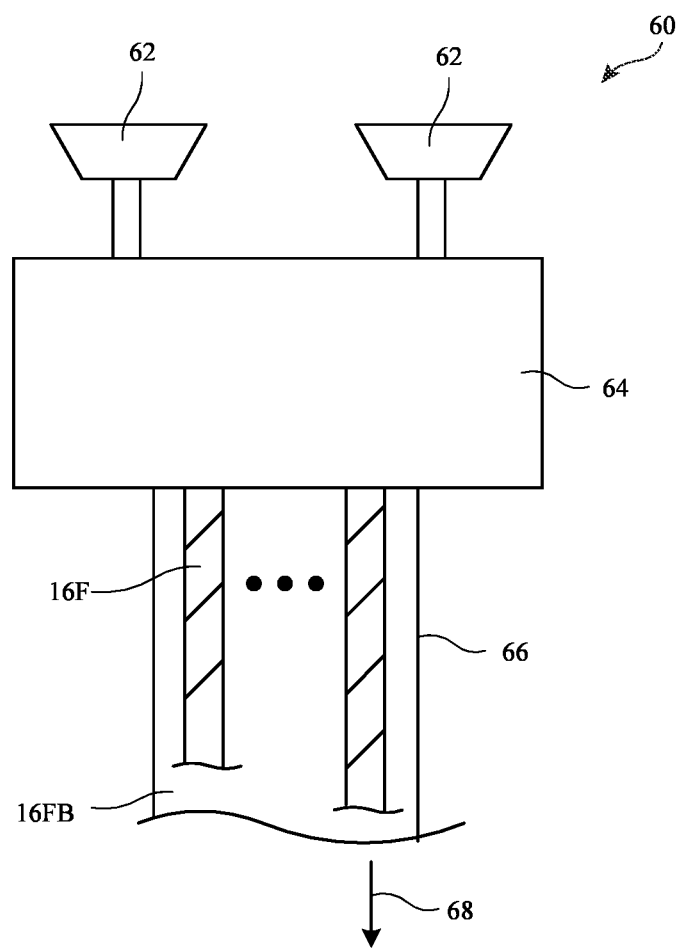
FIG. 7 is a side view of illustrative equipment for forming filaments from elongated strands of binder with embedded fibers in accordance with an embodiment.

An illustrative extrusion tool for forming filaments of image transport layer material is shown in FIG. 7. As shown in FIG. 7, extruder 60 may include hoppers 62 that contain different types of material to be extruded (e.g., different polymers such as binder polymer and fiber core polymer). The material from hoppers 62 may be provided to coextrusion die set 64. During coextrusion, the material from hoppers 62 is coextruded through extrusion die set 64 and forms one or more elongated extruded members such as extruded filament 66, which exits extrusion die set 64 in direction 68. In the example of FIG. 7, filament 66 includes multiple fibers 16F embedded in an elongated strand of binder 16FB (see, e.g., binder 16FB of FIG. 2). Fibers 16F may each have a core 16F-1 covered with a coating layer 16F-2 (e.g., a transparent cladding) as described in connection with FIG. 2 or may be other suitable fibers (e.g., fibers having cores with or without cladding, cores with multiple cladding layers, cores and/or coatings with light-absorbing material and/or transparent material, etc.).

A single filament 66 is being extruded from extrusion die set 64 in FIG. 7. If desired, multiple filaments 66 may be extruded in parallel from die set 64 (e.g., to form bundles of filaments 66 at the output of die set 64). In such configurations, filaments 66 may be debundled prior to subsequent operations (e.g., before fusing a layer of filaments 66 together to form a sheet of image transport layer material).

Extrusion die set 64 may include one or more layers with channels configured to distribute fiber core material into multiple cores fibers 16F embedded in binder 16FB during extrusion. Filaments such as filament 66 may have circular cross-sectional shapes and may contain any suitable number of fiber cores and fibers (e.g., at least 3, at least 10, at least 30, at least 100, at least 500, at least 2500, fewer than 20,000, fewer than 4000, fewer than 500, fewer than 100, and/or other suitable number of fiber cores and fibers 16F).

When it is desired to join the filaments produced by extruder 60 (e.g., extruded strands such as multi-core filament 66 of FIG. 7 or other elongated polymer members), the filaments may be placed in fusion equipment, which fuses the filaments by applying heat and pressure (e.g., heat and pressure that helps fuse the binder material of the filaments together). In-line fusion tools (e.g., fusers with rollers), laser-fusion equipment, fusion equipment that involves wrapping filaments into channels using computer-controlled equipment that maintains desired angular orientations and tensions computer-controlled, and/or other illustrative fusing tools may be used to fuse filaments together to form image transport layer material.

To help ensure satisfactory alignment of filaments 66 with respect to each other during fusion (and therefore ensure satisfactory alignment of fibers 16F and fiber cores 16F-1 in image transport layer 16 and a desired low level of visual artifacts in the coherent fiber bundle), it may be desirable to fuse a single layer of filaments 66 together to form a filament sheet (sometimes referred to as a coherent fiber bundle sheet, a sheet of filaments, a sheet of image transport layer material, etc.). Multiple sheets can then be stacked and fused to form a coherent fiber bundle in which filaments are packed together with a desired filament alignment and density. Such coherent fiber bundle material may sometimes be referred to as sheet-packed coherent fiber bundle material, sheet-packed image transport layer material, sheet-stacked image transport layer material, a sheet-packed coherent fiber bundle, sheet-packed filaments, etc.

Figure 8:
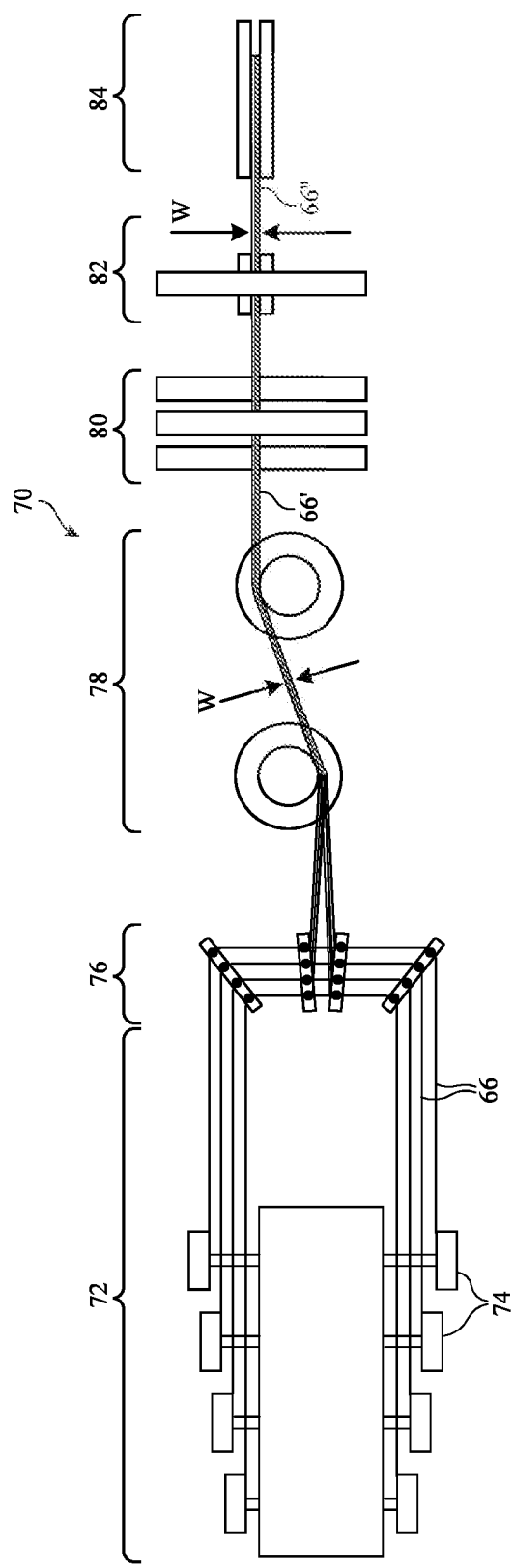
FIG. 8 is a side view of illustrative equipment for forming sheets of fused filaments for an image transport layer in accordance with an embodiment.

Sheets of image transport layer material (e.g., sheets of fused filaments) can be formed using equipment of the type shown in FIG. 8 (as an example). FIG. 8 is a cross-sectional view of an illustrative fusion tool for producing fused filament sheets. As shown in FIG. 8, tool 70 may include filament source 72. Filament source 72 may include multiple single-filament spools 74, each of which may dispense a respective multi-core filament 66 (see, e.g., filament 66 of FIG. 8). Each spool 74 may be mounted on a tension controlling dancer arm and may have a respective separate computer-controlled motor. In configurations in which extruder 60 produces bundles of filaments 66, debundling equipment may be used to separate bundles of filaments 66 into individual filaments 66 each of which may be stored on a respective one of spools 74.

Guide bars 76 may be used to distribute a layer of multiple parallel filaments 66 to one or more aligning wheels 78. Guide bars 76 may have smooth guide rollers to help reduce friction. Aligning wheels 78 may include springs and/or other tensioning mechanisms and may have a tunable wheel gap to receive and align filaments 66. As filaments 66 pass through wheels 78, filaments 66 are aligned so as to form a sheet 66' of aligned unfused filaments of width W. Unfused filament sheet 66' may be passed through a series of interleaved vertically oriented tensioning rods 80 that can be adjusted to increase or decrease friction and therefore control sheet tension.

Rollers 82, which may sometimes be referred to as fusion rollers or pre-fusion rollers, apply heat and/or pressure to the filaments of sheet 66'. Heat and pressure may, for example, be applied to form a sheet of joined (e.g., fused) filaments 66. Sheets may also be formed without sufficient heat and pressure to fuse the filaments together, in which case subsequent fusing operations may be used to fuse filaments 66. The output of rollers 82, which may be an unfused sheet of filaments or a partially or fully fused sheet of filaments (filament sheet 66") may be received by a take-up system such as bobbin 84. Subsequent fusing operations on bobbin 84 or in separate fusing equipment may be used to form a block of sheet-packed coherent fiber bundle material from multiple stacked filament sheets.

Figure 9:
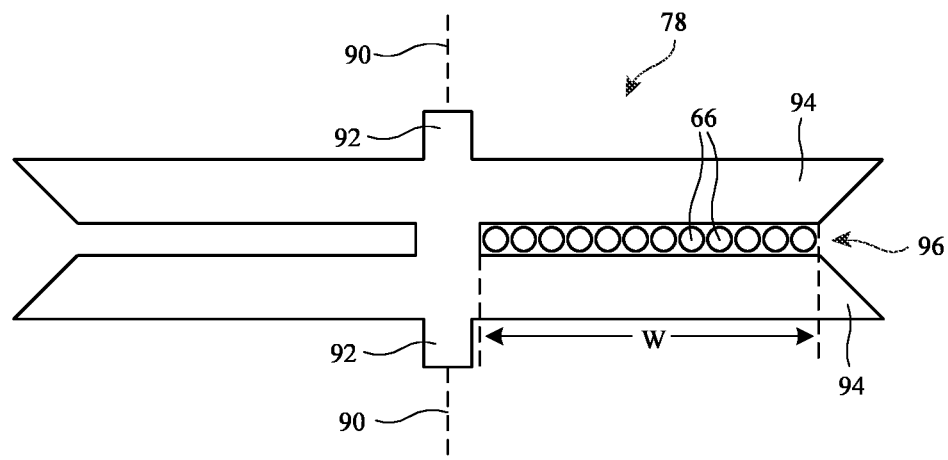
FIG. 9 is a cross-sectional view of an illustrative alignment wheel for use in equipment that forms filament sheets such as the illustrative equipment of FIG. 8 in accordance with an embodiment.

FIG. 9 is a cross-sectional side view of an illustrative alignment wheel for tool 70. As shown in FIG. 9, alignment wheel 78 may have a pair of parallel disc-shaped wheel members 94 mounted on a common shaft such as shaft 92. During operation, wheel 78 rotates about axis 90, which is aligned with shaft 92. Wheel members 94 may be separated by a gap 96 that is configured to accept only a single layer of filaments 66. This ensures that filaments 66 will be aligned in a planar array (in a row) to form a planar filament sheet when passing through wheel 78.

Figure 10:
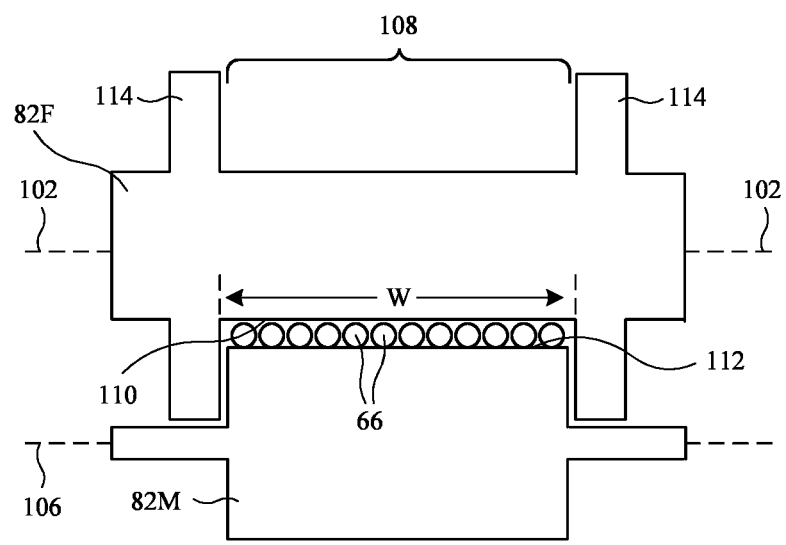
FIG. 10 is a cross-sectional view of illustrative sheet fusing rollers for use in equipment that forms filament sheets such as the illustrative equipment of FIG. 8 in accordance with an embodiment.

Fusion rollers 82 may include mating rollers such as roller 82M and roller 82F of FIG. 10. Roller 82F may rotate about axis 102 as roller 82M rotates in the opposite direction about axis 106. Roller 82M protrudes into gap 108 between roller side walls 114 of roller 82F, so that filaments 66 are compressed between surface 110 of roller 82F and opposing surface 112 of roller 82M. By applying heat and/or pressure while filaments 66 pass through rollers 82F and 82M, filaments 66 of unfused sheet 66' are joined to form joined (fused) filaments 66 of fused sheet 66" (or these filaments may be partly fused or left unfused for subsequent fusing operations).

Figure 11:
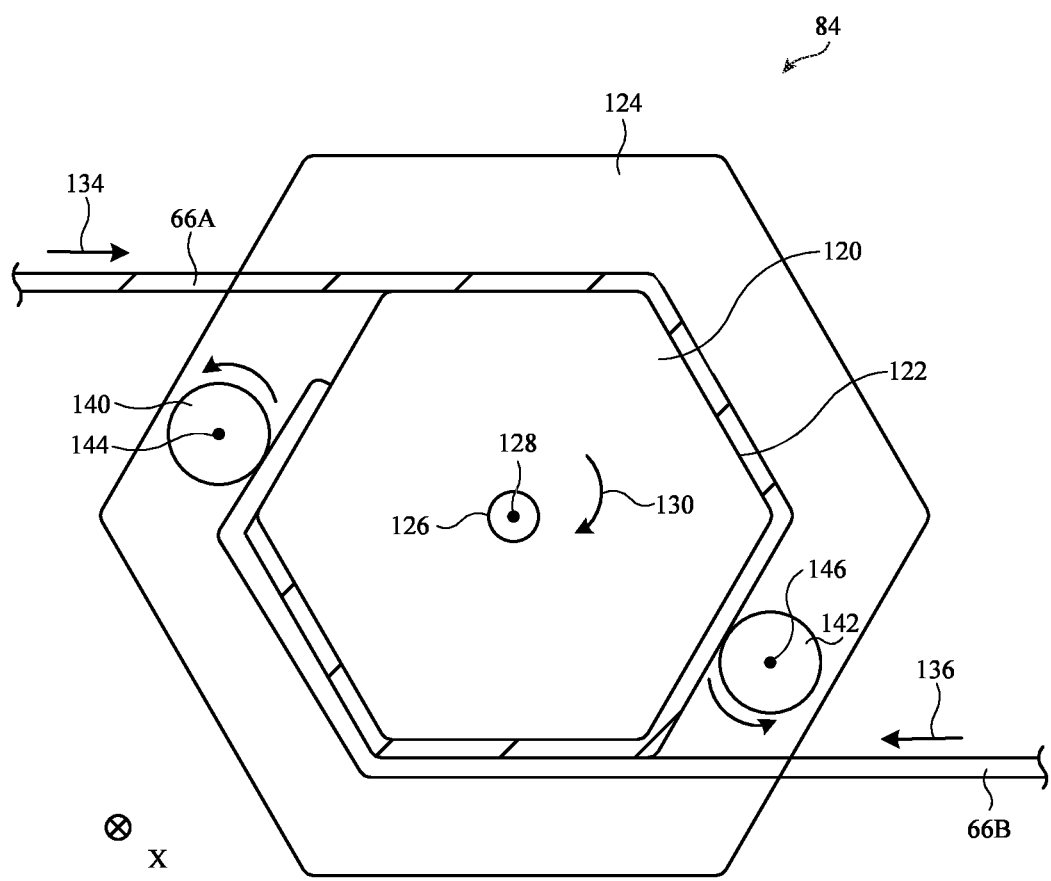
FIG. 11 is a cross-sectional side view of an illustrative bobbin with channels into which sheets of filaments may be placed during sheet packing operations in accordance with an embodiment.

FIG. 11 is a cross-sectional side view of bobbin 84 of FIG. 8. As shown in FIG. 11, bobbin 84 may have non-circular take-up wheel 120 that rotates on shaft 126 about rotational axis 128 in direction 130. Wheel 120 may, for example, have a hexagonal or octagonal shape (as examples). Flat surfaces 122 of wheel 120 allow sheets 66" to be stacked to form blocks of filaments 66, where filaments 66 are straight and run parallel to each other. For example, a hexagonal shape for wheel 120 may allow six sections of coherent fiber bundle material to be formed each of which contains a respective set of parallel filaments 66. Bobbin 84 may have guide walls 124 that help laterally align (into and out of the page in the orientation of FIG. 11) the sheets of fused filaments 66 being wound onto wheel 120.

One or more sheets of filaments 66 may be wound onto wheel 120. In the example of FIG. 11, a first filament sheet (sheet 66A) is being fed in direction 134 onto bobbin 84 while a second filament sheet (sheet 66B, which may be laterally offset along dimension X by half of a filament diameter with respect to sheet 66A) is being fed in direction 136 onto bobbin 84. Pinch rollers 140 and 142, which may be mounted on movable spring-loaded dancer arms, rotate about respective axes 144 and 146 while pressing inwardly on filaments 66 toward surfaces 122. In this way, pinch rollers 140 and 142 hold previously wound sheets of filaments 66 flat to prevent buckling and thereby ensure satisfactory winding and alignment of subsequently stacked layers of filaments.

Figure 12:
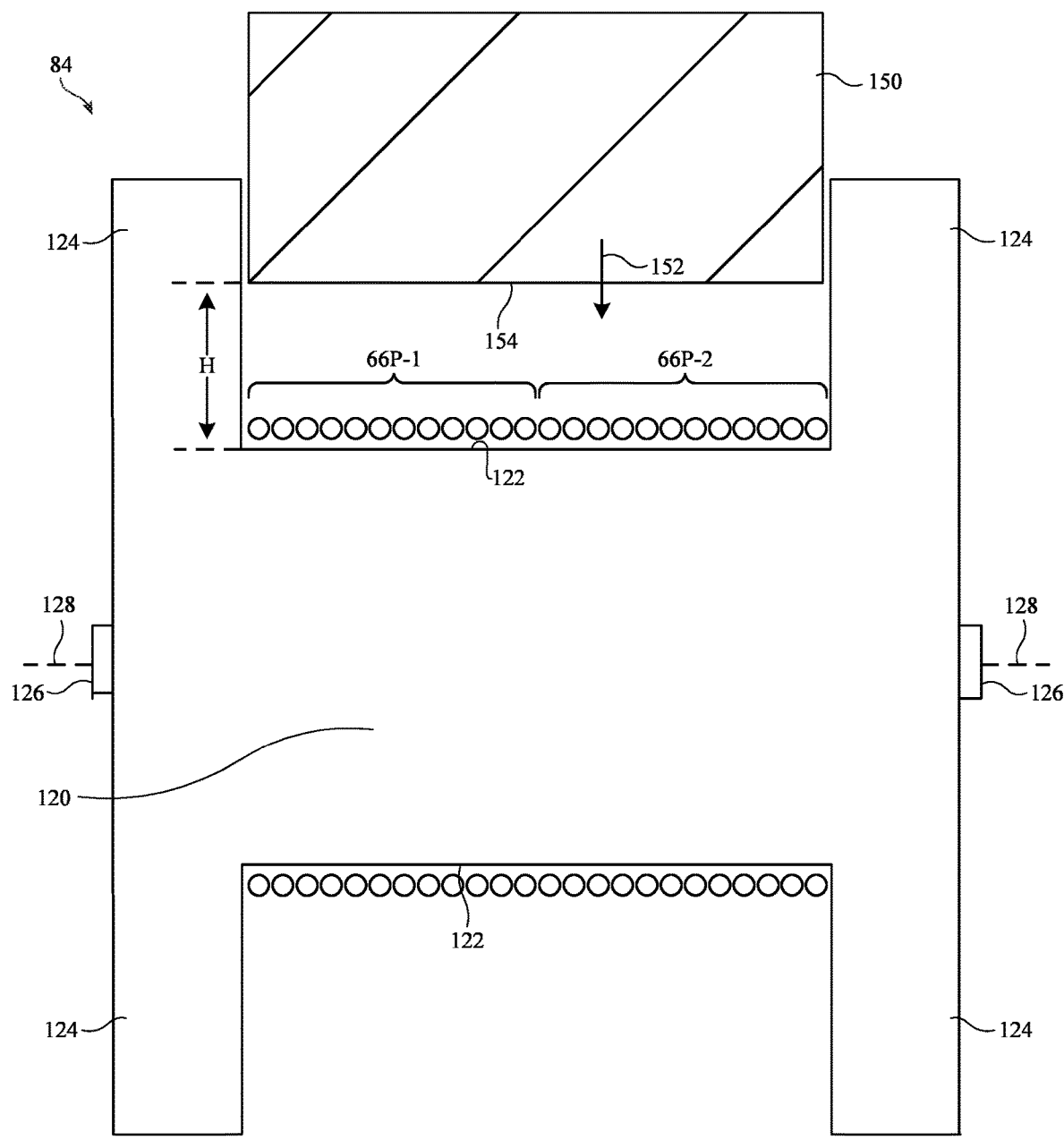
FIG. 12 is a cross-sectional view of an illustrative bobbin and associated sheets of filaments in accordance with an embodiment.

FIG. 12 is a cross-sectional side view of bobbin 84 showing how multiple sub-sheets may be wound around wheel 120 into the channels formed between guide walls 124. In the example of FIG. 12, a sheet of filaments on surface 122 of wheel 120 has been formed by winding a first sheet portion 66P-1 onto one half of wheel 120 and a second sheet portion 66P-2 onto an adjacent second half of wheel 120. There may be three or more laterally adjacent sheet portions that are wound onto wheel 120 in this way, if desired. Multiple sheet portions may be wound onto wheel 120 simultaneously (to deposit three laterally adjacent sheet portions at the same time), laterally adjacent stack portions may be deposited in series, multiple laterally adjacent sheet portion stacks may be formed one after the next, or other patterns of sheet winding may be used to when stacking sheets of filaments 66 onto wheel 120.

After filaments 66 have been stacked to a desired thickness H (e.g., a height equal to the total sheet width or other suitable size), filaments 66 may be fused under vacuum to form a block of image transport layer material. If desired, the channels of bobbin 84 may receive respective heated dies such as die 150. Dies such as die 150 may press inwardly in direction 152 against the stacked sheets of filaments 66 so that filaments 66 are compressed between inwardly facing planar surface 154 of die 150 and outwardly facing planar surface 122 of wheel 120, while being laterally constrained (along dimension X) by the inner surfaces of guide walls 124. In this type of configuration, bobbin 84 serves as a fusion tool. If desired, sheets 66" may be divided into individual planar sheets (e.g., using a sheet slicing tool that cuts rectangular fused sheets from a continuous strip of fused sheet material at the exit to fusion rollers 84 of FIG. 8). When individual planar sheets of fused fibers are formed in this way, a die with a rectangular cavity (or other suitable cavity shape) may receive a set of stacked planar sheets and may pack and fuse these sheets using heat and pressure to form a block of sheet-packed coherent fiber bundle material.

Figure 13:
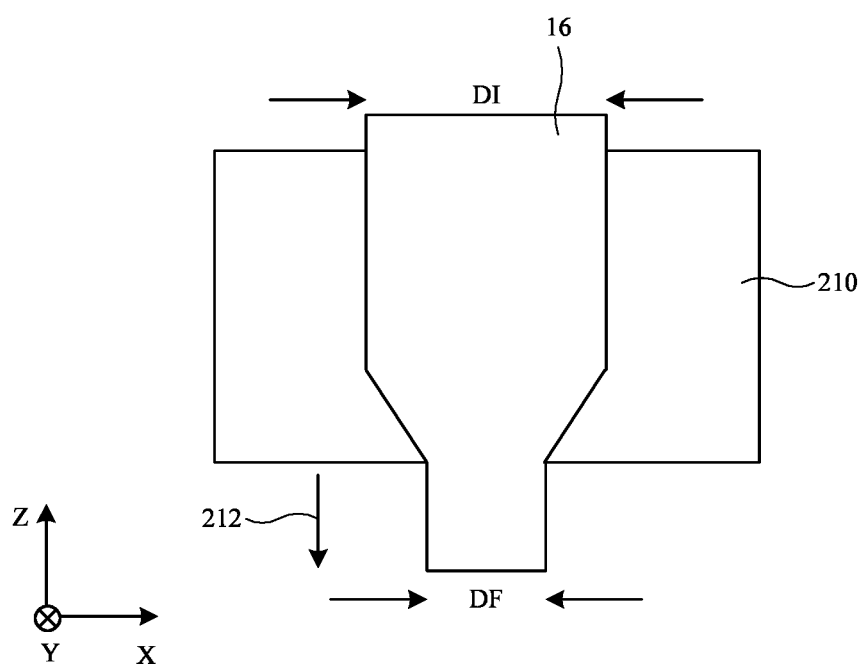
FIG. 13 is a diagram of illustrative drawing equipment for drawing a sheet-packed coherent fiber bundle in accordance with an embodiment.

After fusing sheet-stacked filaments 66 to form a block of image transport layer material, this block of material may be processed using a draw tower or other drawing tool, such as illustrative drawing tool (draw tool) 210 of FIG. 13. During the drawing process, heat and pressure may be applied so that the block of sheet-stacked fused filaments 66 for image transport layer 16 is forced through drawing tool 210 in direction 212. This draws out the block of sheet-stacked fused filaments and reduces the overall lateral dimensions of the block (e.g. from lateral size DI before drawing to lateral size DF after drawing). As a result, the lateral dimensions of fibers 16F and cores 16F-1 are reduced to their desired final dimensions. The drawing process also helps align fibers 16F with the Z axis (e.g., angle A of FIG. 6 is reduced and lateral offset BD is reduced) and helps reduce the size of gaps G. When using a push-out process in which image transport layer material is forced through tool 210 in this way, both heat and pressure are applied. If desired, tool 210 may be omitted and heat (without pressure) may be applied to layer 16. To regulate the amount of lateral size reduction of the drawn material (e.g., to regulate lateral size DF), the drawing tool may dynamically adjust the pulling force/speed with which the bottom of the image transport layer material is pulled downwards (in the −Z direction of FIG. 13).

Figure 14:
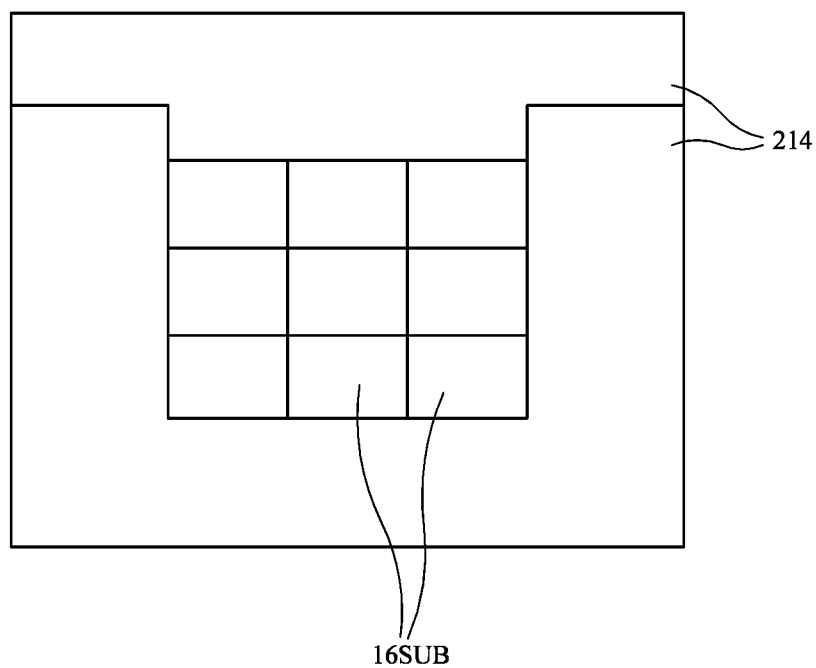
FIG. 14 is a cross-sectional side view of illustrative fusing equipment for fusing together subblocks of drawn sheet-packed coherent fiber bundle material in accordance with an embodiment.

In some configurations, the final size (DF) of the drawn image transport layer material is sufficient to form layer 16 of FIG. 1, so one or more layers of material may be cut (e.g., sliced with a saw and/or other tools) from the drawn block of material and assembled into devices such as device 10 of FIG. 1. In other configurations, the size DF is too small to completely cover the surface of display 14. In these configurations, the image transport layer block being produced at the output of drawing tool 210, which may sometimes be referred to as a subblock, may be fused with other subblocks to form a final desired size and shape for layer 16. This optional subblock fusing process is illustrated in FIG. 14. In the example of FIG. 14, nine rectangular (e.g. square) subblocks 16SUB are being fused in fusing tool 214 to form a larger block of image transport layer material. In general, subblocks 14SUB may have any suitable shape. Following fusing, the image transport layer material may be cut from the fused block to form image transport layer 16 of FIG. 1. In general, any suitable number of subblocks of drawn sheet-stacked image transport layer material may be fused together to increase the lateral dimensions of the image transport layer material that is being produced (e.g., at least 4, at least 10, at least 30, at least 100, at least 1000, fewer than 10000, fewer than 500, fewer than 100, fewer than 30, etc.).

Figure 15:
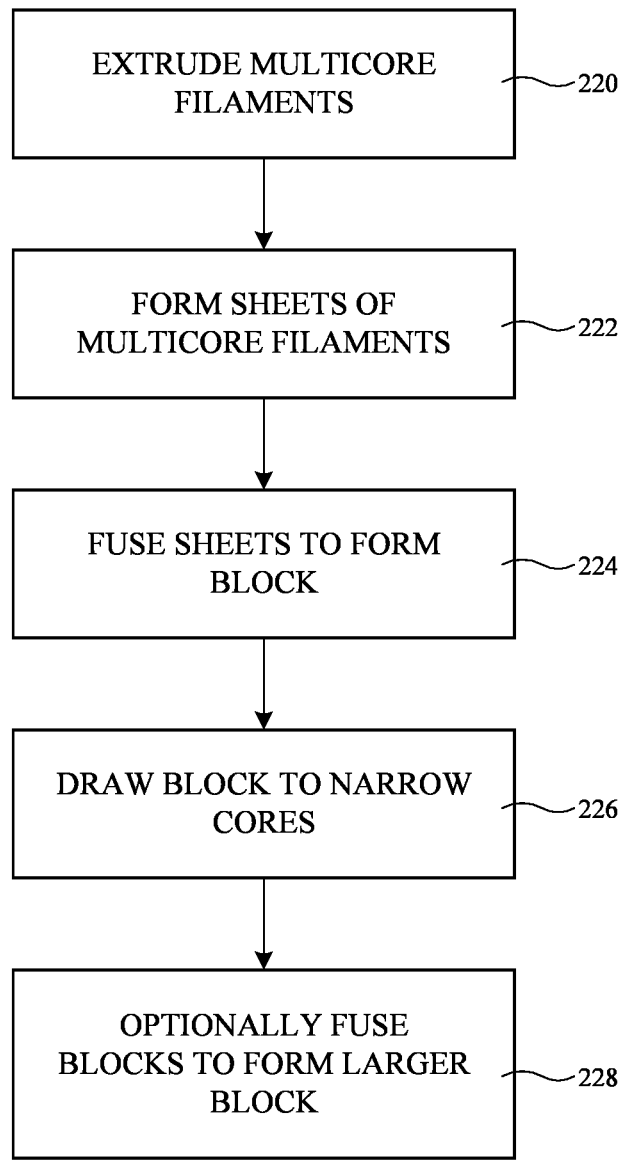
FIG. 15 is a flow chart of illustrative operations involved in forming an electronic device with a drawn sheet-packed coherent fiber bundle in accordance with an embodiment.

Illustrative operations in forming drawn sheet-packed coherent fiber bundle material for device 10 are shown in FIG. 15. During the operations of block 220, a tool such as extrusion tool 60 may be used to extrude multi-core filaments such as filament 66. Each filament may include multiple fibers 16F (e.g., cores 16F-1, optional coating layer 16-2, etc.) embedded in an elongated strand of binder 16FB. The diameter of each filament 66 may be, for example, 250 microns, 100 microns, at least 20 microns, at least 60 microns, less than 150 microns, less than 500 microns, less than 1000 microns, or other suitable size. Filaments 66 may be gathered on single-filament spools or may be gathered on spools in multi-filament bundles that are subsequently debundled into individual filaments 66 for source 72 of tool 70 (FIG. 8). To account for subsequent reductions in the diameters of fibers 16F during drawing, the diameters of fibers 16F (and cores 16F-1) may be larger in filaments 66 than desired for the final image transport layer in device 10. For example, the diameters of fibers 16F (and/or cores 16F-1) may be 37 microns, at least 20 microns, at least 30 microns, less than 60 microns, less than 45 microns, or other suitable size that is larger than the diameters of fibers 16F in layer 16 of device 10.

During the operations of block 222, filaments 66 are fused or otherwise joined into sheets such as fused sheet 66" (e.g., using fusion rollers 82 of FIG. 8).

During the operations of block 224, alternating laterally offset sheets of filaments 66A and 66B are wound onto bobbin 84 and heat and pressure is applied (e.g., using die 150 of FIG. 12) to form a sheet-packed coherent fiber bundle.

During the operations of block 226, the block of image transport layer material formed during the operations of block 224 may be drawn using a drawing tool such as drawing tool 210 of FIG. 13. This reduces the lateral dimensions of the block of material. If, as an example, a block has an initial lateral dimension (width) of DI, the block may, following the drawing operation, have a lateral dimension (width) of DF that is less than DI. The draw ratio DR of the fused sheet-stacked coherent fiber bundle (sometimes referred to as the sheet-stacked coherent fiber bundle draw ratio, fused fiber bundle draw ratio, or fiber bundle draw ratio) is equal to $DI^2/DF^2$ (which is equal to $D1^2/D2^2$ of equation 1). During drawing, the lateral dimensions of fibers 16F are reduced to their desired final values. For example, the initial diameter of fibers 16F or cores 16F-1 may be 37 microns (as an example) and, following the drawing operations of block 226, the diameters of fibers 16F or cores 16F-1 may be about 10 microns (e.g., the draw ratio DR may be about 14). The thickness of coating layer 16F-1 following the drawing operations of block 226 may be, as an example, 0.5 microns.

During the operations of block 228, multiple drawn blocks may optionally be fused together using fusing tool 214 of FIG. 14. As an example, the image transport layer material produced during the operations of block 224 may have lateral dimensions in the X and Y dimensions of 50 mm (at least 10 mm, at least 30 mm, less than 250 mm, less than 70 mm, etc.). During the operations of block 228, multiple subblocks such as these may be fused to form a larger block of image transport layer material that can be used to form layer 16 of FIG. 1. The lateral dimensions of layer 16 may be at least 1 cm, at least 5 cm, at least 10 cm, at least 30 cm, less than 1 m, less than 100 cm, less than 50 cm, less than 20 cm, less than 12 cm, less than 6 cm, less than 4 cm, or other suitable value.

After forming drawn sheet-packed coherent fiber bundle material during the operations of blocks 220, 222, 224, 226, and optionally block 228, the image transport layer material may be optionally deformed (thermally formed) by applying heat and pressure (e.g., in a heated mold). For example, the image transport layer material can be squeezed together so as to deform fibers 16F and cause fibers 16F to exhibit one or more bends along their lengths as shown in FIG. 1.

After forming image transport layer material with desired properties (desired outer dimensions, desired fiber diameters, desired amounts of deformation, etc.), a saw or other equipment may be used to slice a layer of image transport layer material from the deformed image transport layer block. This layer may be shaped using grinding tools, polishing tools, and/or other equipment to form a finished version of image transport layer 16 (see, e.g., layer 16 of FIG. 1). This layer may then be assembled into device 10. For example, display cover layer 30, the polished drawn sheet-packed coherent fiber bundle (image transport layer 16), display 14, and other structures may be assembled into housing 12 to form electronic device 10. For example, layers such as layers 30 and 16 and display 14 may be joined using layers of adhesive. Display 14, layer 30, layer 16, and associated support structures and internal components can be coupled to housing 12 using adhesive, fasteners (e.g., screws), welds, press-fit joints, flexible engagement structures (e.g., springs, clips, etc.), and/or may be mounted to housing 12 using other mounting structures.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a display configured to produce an image; and
a drawn sheet-packed coherent fiber bundle overlapping the display, wherein the drawn sheet-packed coherent fiber bundle is configured to receive the image at an input surface and to transport the received image to an output surface and wherein the drawn sheet-packed coherent fiber bundle comprises a coherent fiber bundle block drawn from a fused set of sheets of filaments.

2. The electronic device defined in claim 1 wherein the drawn sheet-packed coherent fiber bundle has fibers and wherein 90% of the fibers in the drawn sheet-packed coherent fiber bundle are separated from neighboring fibers by gaps of less than 0.7 microns.

3. The electronic device defined in claim 1 wherein the drawn sheet-packed coherent fiber bundle is characterized by a fiber bundle draw ratio of at least three.

4. The electronic device defined in claim 1 wherein the drawn sheet-packed coherent fiber bundle has fibers and wherein at least 90% of the fibers in the drawn sheet-packed coherent fiber bundle are angularly misaligned by less than 0.8°.

5. The electronic device defined in claim 4 wherein the drawn sheet-packed coherent fiber bundle forms an image transport layer with a thickness of at least 1.2 mm.

6. The electronic device defined in claim 1 wherein the drawn sheet-packed coherent fiber bundle has fibers and wherein 90% of the fibers in the drawn sheet-packed coherent fiber bundle exhibit lateral misalignment at the input surface of less than 30 microns.

7. The electronic device defined in claim 1 wherein the display has pixels, wherein each pixel has a lateral dimension and wherein 90% of the fibers in the drawn sheet-packed coherent fiber bundle exhibit lateral misalignment at the input surface of less than 50% of the lateral dimension.

8. The electronic device defined in claim 1 wherein the drawn sheet-packed coherent fiber bundle comprises additional coherent fiber bundle blocks fused together with the coherent fiber bundle block and wherein each of the additional coherent fiber bundle blocks is drawn from a respective fused set of sheets of filaments.

9. The electronic device defined in claim 1 wherein the drawn sheet-packed coherent fiber bundle has additional fused sheets of filaments.

10. The electronic device defined in claim 9 wherein each fused sheet of filaments has fiber cores with cladding layers embedded in binder.

11. The electronic device defined in claim 1 wherein each filament in the fused set of sheets of filaments has multiple fiber cores.

12. The electronic device defined in claim 11 wherein the fiber cores include fiber cores with multiple bends.

13. An electronic device, comprising:
a display having pixels configured to produce an image; and
a coherent fiber bundle that overlaps the display, wherein the coherent fiber bundle comprises fibers, wherein each pixel has a lateral dimension, wherein the coherent fiber bundle has an input surface that is configured to receive the image and has a corresponding output surface to which the image is transported, and wherein 90% of the fibers in the coherent fiber bundle exhibit lateral misalignment at the input surface of less than 50% of the lateral dimension.

14. The electronic device defined in claim 13 wherein the coherent fiber bundle comprises a drawn stack of fused filament sheets that is characterized by a draw ratio of at least 2.5.

15. The electronic device defined in claim 14 wherein the drawn stack of fused filament sheets has fused filaments each of which includes more than one of the fibers.

16. The electronic device defined in claim 15 wherein the fibers include fibers with multiple bends.

17. The electronic device defined in claim 13 wherein 90% of the fibers are separated from neighboring fibers by gaps of less than 0.7 microns.

18. The electronic device defined in claim 13 wherein at least 90% of the fibers are angularly misaligned by less than 0.8°.

19. An image transport layer configured to receive an image at an input surface and to transport the image to a corresponding output surface, comprising:
a drawn sheet-packed coherent fiber bundle extending between the input surface and the output surface, wherein the drawn sheet-packed coherent fiber bundle is drawn from fused sheets of filaments, each sheet having multiple fused filaments.

20. The image transport layer defined in claim 19 wherein each filament includes multiple fibers in binder.

21. The image transport layer defined in claim 20 wherein 90% of the fibers are separated from neighboring fibers by gaps of less than 0.7 microns.

22. The image transport layer defined in claim 20 wherein at least 90% of the fibers are angularly misaligned by less than 0.8°.

* * * * *